United States Patent
Ikeda et al.

(10) Patent No.: US 12,473,471 B2
(45) Date of Patent: Nov. 18, 2025

(54) LAMINATE, PRODUCTION METHOD THEREFOR, AND AUTOMOTIVE EXTERIOR MATERIAL

(71) Applicant: MITSUBISHI CHEMICAL CORPORATION, Tokyo (JP)

(72) Inventors: Masashi Ikeda, Tokyo (JP); Seiji Takagi, Tokyo (JP); Toru Seo, Tokyo (JP); Jun Matsui, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 360 days.

(21) Appl. No.: 17/836,369

(22) Filed: Jun. 9, 2022

(65) Prior Publication Data

US 2022/0298397 A1 Sep. 22, 2022

Related U.S. Application Data

(63) Continuation of application No. PCT/JP2020/047656, filed on Dec. 21, 2020.

(30) Foreign Application Priority Data

Dec. 25, 2019 (JP) ................................. 2019-235250

(51) Int. Cl.
| | |
|---|---|
| C09J 163/00 | (2006.01) |
| B32B 7/027 | (2019.01) |
| B32B 7/12 | (2006.01) |
| B32B 15/01 | (2006.01) |
| B32B 37/12 | (2006.01) |
| C09J 7/21 | (2018.01) |
| C09J 7/35 | (2018.01) |

(52) U.S. Cl.
CPC ............. C09J 163/00 (2013.01); B32B 7/027 (2019.01); B32B 7/12 (2013.01); B32B 15/012 (2013.01); B32B 37/1207 (2013.01); C09J 7/21 (2018.01); C09J 7/35 (2018.01)

(58) Field of Classification Search
CPC .......... C09J 163/00–163/10; B32B 7/00–7/14; B32B 15/092
See application file for complete search history.

(56) References Cited

U.S. PATENT DOCUMENTS

| | | | |
|---|---|---|---|
| 2017/0029673 A1* | 2/2017 | Krishnan | ........... C08G 18/7621 |
| 2017/0334171 A1 | 11/2017 | Takada et al. | |
| 2018/0345644 A1 | 12/2018 | Kang et al. | |
| 2019/0084274 A1 | 3/2019 | Hirano et al. | |
| 2020/0331832 A1 | 10/2020 | Arita et al. | |
| 2022/0177748 A1 | 6/2022 | Otsuki | |

FOREIGN PATENT DOCUMENTS

| | | | |
|---|---|---|---|
| CN | 108349230 A | 7/2018 | |
| CN | 109427245 A | 3/2019 | |
| JP | 2004-323639 A | 11/2004 | |
| JP | 2007-196545 A | 8/2007 | |
| JP | 2018-177961 A | 11/2018 | |
| JP | 2020-55144 A | 4/2020 | |
| JP | 2020-55299 A | 4/2020 | |
| TW | 201930386 A | 8/2019 | |
| WO | WO 2014/071334 A2 | 5/2014 | |
| WO | WO 2016/076344 A1 | 5/2016 | |
| WO | WO-2016174469 A1 * | 11/2016 | ........... C08G 59/223 |
| WO | WO 2017/169571 A1 | 10/2017 | |
| WO | WO 2020/189579 A1 | 9/2020 | |

OTHER PUBLICATIONS

Office Action for CN App. No. 202080088362.4, dated May 29, 2023 (w/ translation).
ESR for EP App. No. 20905196.0, dated May 19, 2023.
ISR for PCT/JP2020/047656, dated Feb. 16, 2021.
IPRP for PCT/JP2020/047656, dated Jul. 7, 2022 (w/ translation).
Office Action dated Feb. 18, 2025, issued in Japanese patent application No. 2021-567435 with English machine translation thereof.
Office Action issued May 27, 2025 in Korean Patent Application No. 10-2022-7020806 with English machine translation thereof.

\* cited by examiner

*Primary Examiner* — Prashant J Khatri
(74) *Attorney, Agent, or Firm* — GREENBLUM & BERNSTEIN, P.L.C.

(57) ABSTRACT

A laminate produced by laminating a plurality of materials having different linear expansion coefficients via an adhesive agent and is less liable to warp after the adhesive agent is heat-cured. The laminate has a structure including a first material, an adhesive agent layer, and a second material. The first material and the second material have different linear expansion coefficients, and the adhesive agent layer contains an adhesive agent having a warpage reduction index of not less than 30 as calculated from the following expression (1):

Warpage reduction index=$100-(WA/WB)\times100$  (1).

14 Claims, No Drawings

LAMINATE, PRODUCTION METHOD THEREFOR, AND AUTOMOTIVE EXTERIOR MATERIAL

RELATED APPLICATIONS

This application is a continuation of International Application No. PCT/JP2020/047656, filed on Dec. 21, 2020, which claims priority to Japanese Patent Application No. 2019-235250, filed on Dec. 25, 2019, the entire contents of each of which being herein incorporated by reference.

TECHNICAL FIELD

The present disclosure relates to a laminate produced by laminating a plurality of materials having different linear expansion coefficients, a production method for the laminate, and an automotive exterior material.

BACKGROUND ART

In recent years, considerations have been given to the weight reduction of automobiles for improvement of the fuel economy of the automobiles and for reduction of the carbon dioxide emission of the automobiles. For example, it is considered to use a composite material prepared by laminating a plurality of materials (e.g., a steel plate, an aluminum plate, and the like) as an automotive exterior material in order to improve the strength and the workability of the automotive exterior material while reducing the weight of the automotive exterior material.

Where the plurality of materials are laminated together via an adhesive agent and then the adhesive agent is heat-cured, however, the resulting laminate is liable to warp due to a difference in linear expansion coefficient between the materials.

For reduction of the warpage of the laminate including the plurality of materials having different linear expansion coefficients, for example, PTL 1 discloses an adhesive structure in which adherends having different thermal expansions are bonded together via an adhesive agent layer. In the disclosed adhesive structure, the adhesive agent layer has a two-layer structure including two layers, at least one of which is formed from a flexible epoxy composition mainly containing an epoxy resin having two or more epoxy groups and having flexibility in a cured state.

PTL 2 discloses a three-layer metal-resin composite structure in which a metal plate and a fiber-reinforced resin composition are bonded together via a foamed resin composition. The foamed resin composition contains 100 parts by mass of an epoxy resin, 2 to 30 parts by mass of carbon fibers and/or glass fibers having a fiber length of 1 to 3 mm and a fiber diameter of 5 to 20 μm, 3 to 30 parts by mass of a thermal activation type curing agent for the epoxy resin, 0.5 to 15 parts by mass of a thermal activation type curing catalyst for the epoxy resin, 0.5 to 15 parts by mass of a thermal decomposition type organic foaming agent, 50 to 200 parts by mass of an inorganic filler having an aspect ratio of 2:1 or more, and 2 to 15 parts by mass of a defoaming agent.

RELATED ART DOCUMENTS

Patent Documents

PTL 1: JP-A-2004-323639
PTL 2: JP-A-2007-196545

SUMMARY

The present disclosure provides a laminate produced by laminating a plurality of materials having different linear expansion coefficients via an adhesive agent and having a reduced warpage after the adhesive agent is heat-cured.

According to one embodiment of the present invention, there is provided a laminate, which includes a first material, an adhesive agent layer, and a second material laminated in this order, wherein the first material and the second material have different linear expansion coefficients, and wherein the adhesive agent layer contains an adhesive agent having a warpage reduction index of not less than 30,
the warpage reduction index of the adhesive agent being determined by:
preparing an analysis model laminate having:
an aluminum plate having a width of 25 mm, a length of 100 mm, and a thickness of 1.6 mm,
a cold-rolled steel plate having a width of 25 mm, a length of 100 mm, and a thickness of 1.6 mm, and
a layer of the adhesive agent between the aluminum plate and the cold-rolled steel plate, the layer of the adhesive agent having a thickness of 0.7 mm;
preparing a reference model laminate having:
an aluminum plate having a width of 25 mm, a length of 100 mm, and a thickness of 1.6 mm, and
a cold-rolled steel plate having a width of 25 mm, a length of 100 mm, and a thickness of 1.6 mm,
wherein the reference model laminate does not have any adhesive agent between the aluminum plate and the cold-rolled steel plate;
determining a displacement amount WA at an end of the analysis model laminate by finite element structure analysis using Computer Aided Engineering (CAE) software while a middle portion of the cold-rolled steel plate is fixed in place and a temperature of the analysis model laminate is changed from a starting temperature of 180° C. to a final temperature of 25° C.;
determining a displacement amount WB at an end of the reference model laminate by finite element structure analysis using Computer Aided Engineering (CAE) software while a middle portion of the cold-rolled steel plate is fixed in place and a temperature of the reference model laminate is changed from a starting temperature of 180° C. to a final temperature of 25° C.; and
calculating the warpage reduction index from the following expression (1):

Warpage reduction index=100−($WA/WB$)×100　　(1).

According to another embodiment of the present invention, there is provided a laminate, which has a structure including a first material, an adhesive agent layer, and a second material, wherein the first material and the second material have different linear expansion coefficients, and the adhesive agent layer has an average storage elastic modulus of 1 to 400 MPa in a temperature range of 25° C. to 180° C.

The laminates according to the embodiments of the present invention, which are each produced by laminating the plurality of materials having different linear expansion coefficients, are less liable to warp after the adhesive agent is heat-cured.

DESCRIPTION OF EMBODIMENTS

The present invention will hereinafter be described in greater detail by way of exemplary embodiments thereof, but the present invention is not limited to these embodiments.

1. Laminate

A laminate according to one embodiment of the present invention has a structure including a first material, an adhesive agent layer, and a second material. The first material and the second material have different linear expansion coefficients, and the adhesive agent layer contains an adhesive agent having a warpage reduction index of not less than 30 as calculated from the above expression (1).

(1) First and Second Materials

In this embodiment, the first and second materials are not particularly limited, as long as the linear expansion coefficients thereof are different from each other.

Usable as the first and second materials are metals, resins, and glass materials. These materials may each be used alone, or two or more of these materials may be used in desired combination at desired ratio.

Usable examples of the metals include elemental metals such as aluminum, iron, copper, titanium, and magnesium, and alloys containing at least one selected from these elemental metals.

Usable examples of the resins include: curable resins such epoxy resins, phenol resins, vinyl ester resins, urethane resins, melamine resins, urea resins, silicone resins, acrylic resins, and unsaturated polyester resins; and thermoplastic resins such as polyethylene resins, polypropylene resins, polyamide resins, polystyrene resins, ABS (acrylonitrile-butadiene-styrene copolymer) resins, acrylic resins, polyvinyl chloride resins, polyester resins (polyethylene terephthalates and PBT (polybutylene terephthalates), polyoxymethylene resins, polyamide resins, fluororesins, polyimide resins, polyaminoamide resins, PES (polyether sulfone) resins, PPS (polyphenylene sulfide) resins, PEI (polyetherimide) resins, PPE (polyphenylene ether) resins, poly-p-phenylene benzoxazole resins, PEEK (polyether ether ketone) resins, polyacetal resins, polycarbonate resins, and polyamideimide resins.

Further, fiber-reinforced resins produced by adding reinforcing fibers to any of the aforementioned resins are also usable. Usable examples of the reinforcing fibers include: inorganic fibers such as carbon fibers, silicon carbide fibers, alumina fibers, boron fibers, and glass fibers; organic fibers such as polyester fibers, polyethylene terephthalate fibers, poly-p-phenylene benzobisoxazole fibers, aramid fibers, polyacetal fibers, polyethylene fibers, and polyacrylonitrile fibers; and natural fibers such as cellulose fibers.

Where metals are used in combination as the first and second materials, particularly where the first or second material contains aluminum or iron, further where the first material contains aluminum and the second material contains iron, the present disclosure can be advantageously employed.

Where the first and second materials are metals and a difference in linear expansion coefficient between the first material and the second material is not less than $2\times10^{-6}$ [1/K], particularly not less than $5\times10^{-6}$ [1/K], the present disclosure can be advantageously employed.

The upper limit of the difference in linear expansion coefficient between the first material and the second material is not particularly limited. However, where the upper limit of the linear expansion coefficient difference is not greater than $1\times10^{-4}$ [1/K], particularly not greater than $9\times10^{-5}$ [1/K], especially not greater than $7\times10^{-5}$ [1/K], the present disclosure can be advantageously employed.

In this embodiment, the first and second materials each preferably have a thickness of 0.1 to 10 mm, more preferably 0.3 to 5 mm. Where the thicknesses of the first and second materials each fall within the aforementioned range, it is possible to satisfy the requirements for the weight reduction and the rigidity, ensuring advantageous automotive use.

(2) Adhesive Agent Layer

In this embodiment, the adhesive agent layer contains an adhesive agent having a warpage reduction index of not less than 30 as calculated from an expression (1) to be described later.

In this embodiment, the specific adhesive agent layer is provided between the first material and the second material having different linear expansion coefficients to absorb the linear expansion coefficient difference between the first material and the second material, whereby the warpage of the laminate can be reduced.

The adhesive agent having a warpage reduction index of not less than 30 can be obtained by adjusting the type, the formulation, the average storage elastic modulus, the thickness, and the like of the adhesive agent as will be described later.

<<Warpage Reduction Index>>

In the present disclosure, the term "warpage reduction index" means how much the warpage of a laminate prepared by providing a layer of the adhesive agent between an aluminum plate and a cold-rolled steel plate (SPCC) is reduced with respect to the warpage of a laminate including no adhesive agent layer between the aluminum plate and the cold-rolled steel plate (SPCC) after the laminates are heated.

More specifically, the warpage reduction index can be determined by the following method.

An aluminum plate (having a linear expansion coefficient of $23\times10^{-6}$ [1/K], a Young's modulus of 70 GPa, and a Poisson ratio of 0.3) having a width of 25 mm, a length of 100 mm, and a thickness of 1.6 mm, and a cold-rolled steel plate (SPCC) (having a linear expansion coefficient of $16\times10^{-6}$ [1/K], a Young's modulus of 200 GPa, and a Poisson ratio of 0.3) having a width of 25 mm, a length of 100 mm, and a thickness of 1.6 mm are prepared. The adhesive agent is applied to a thickness of 0.7 mm between the aluminum plate and the cold-rolled steel plate (SPCC), and the resulting laminate (an analysis model laminate) is divided into finite elements of an analysis model. When the temperature of the analysis model laminate is changed from 180° C. to 25° C. with a middle portion of the cold-rolled steel plate (SPCC) fixed in place, a displacement amount (warpage amount (A)) at an end of the analysis model laminate is determined through simulation with the use of an CAE (Computer Aided Engineering) software.

In substantially the same manner as described above, a reference model laminate is prepared without providing the adhesive agent layer between the aluminum plate and the cold-rolled steel plate (SPCC), and a displacement amount (warpage amount (B)) of the reference model laminate is determined with the use of the CAE software. The warpage reduction index is calculated from the following expression (1):

$$\text{Warpage reduction index} = 100 - (WA/WB) \times 100 \qquad (1)$$

wherein WA is the warpage amount (A), and WB is the warpage amount (B).

The above expression (1) obviously indicates that the warpage of the laminate is reduced as the value of the warpage reduction index increases. The warpage reduction index is preferably not less than 30, more preferably not less than 40, with its upper limit defined as 100.

<<Average Storage Elastic Modulus>>

In this embodiment, the adhesive agent cured in the laminate having the first material/adhesive agent layer/second material structure preferably has an average storage elastic modulus of 1 to 400 MPa in a temperature range of 25° C. to 180° C. Where the average storage elastic modulus falls within the above numerical range, it is possible to reduce the warpage of the laminate while improving the adhesion between the first material and the second material.

In a temperature range higher than the glass transition temperature (Tg) of the adhesive agent within a temperature range of 25° C. to 180° C., the storage elastic modulus is lower, and a strain occurring due to the difference in linear expansion coefficient between the first material and the second material is mostly relaxed by the adhesive agent. Thus, the laminate is less liable to warp. In a temperature range lower than the glass transition temperature (Tg) of the adhesive agent, on the other hand, the storage elastic modulus is higher, and the strain occurring due to the difference in linear expansion coefficient between the first material and the second material is less likely to be relaxed by the adhesive agent. Thus, the laminate is more liable to warp. Therefore, a total strain occurring in the laminate and a total strain relaxed by the adhesive agent in the temperature ranges higher and lower than the glass transition temperature (Tg) are leveled by averaging storage elastic moduli observed in a temperature range of 25° C. to 180° C. Therefore, the average storage elastic modulus in a temperature range of 25° C. to 180° C. correlates with the actual warpage.

For the improvement of the adhesion between the first material and the second material, the average storage elastic modulus is preferably not less than 5 MPa, more preferably not less than 10 MPa, still more preferably not less than 50 MPa, more preferably not less than 80 MPa.

In order to absorb the linear expansion coefficient difference between the first material and the second material, the average storage elastic modulus is preferably not greater than 300 MPa, more preferably not greater than 200 MPa, still more preferably not greater than 150 MPa, more preferably not greater than 120 MPa.

The average storage elastic modulus of the adhesive agent can be adjusted not only by selecting the formulation of the adhesive agent (e.g., a base resin, a curing agent, and other components), but also by a method (a) in which a molecular skeleton for imparting the base resin with flexibility is introduced into a main chain of the base resin, a method (b) in which a plasticizer or a reactive diluent is added to the adhesive agent, or a method (c) in which an elastomer or a thermoplastic resin is added as a modifier.

The average storage elastic modulus can be determined, for example, by the following method.

The adhesive agent is applied to a thickness of 0.5 mm onto a Teflon® plate, and heat-cured at 180° C. for 20 minutes. Thereafter, the cured adhesive agent is naturally cooled, and then a test piece having a width of 5 mm and a length 10 mm is prepared by cutting the cured adhesive agent. The storage elastic moduli of the test piece are measured at a frequency of 10 Hz at a temperature increase rate of 10° C./minute in a measurement temperature range of 25° C. to 180° C. with the use of a dynamic viscoelasticity measuring apparatus (DVA 225 available from IT measurement control Company) and a tension jig. The average storage elastic modulus in a temperature range of 25° C. to 180° C. is calculated by dividing the sum of the storage elastic moduli measured in a measurement temperature range of 25° C. to 180° C. by the number of measurement points.

<<Average Linear Expansion Coefficient>>

In this embodiment, the adhesive agent layer typically has an average linear expansion coefficient (also referred to as "average thermal expansion coefficient") of greater than 0 ppm/K, preferably not less than 10 ppm/K, more preferably not less than 20 ppm/K, still more preferably not less than 30 ppm/K, particularly preferably not less than 50 ppm/K, as measured in a measurement range within a temperature range of not lower than 0° C. and not higher than the glass transition temperature of the adhesive agent layer.

The average linear expansion coefficient of the adhesive agent layer is typically not greater than 5,000 ppm/K, preferably not greater than 2,000 ppm/K, more preferably not greater than 1,000 ppm/K, still more preferably not greater than 800 ppm/K, particularly preferably not greater than 600 ppm/K, most preferably not greater than 400 ppm/K.

The aforementioned range of the average linear expansion coefficient is preferred, because the interlayer strain between the first material and the second material in the laminate can be reduced to thereby suppress warpage and delamination.

The average linear expansion coefficient of the adhesive agent layer can be measured by thermomechanical analysis in conformity with JIS K7197 (2012).

For example, a sample having a width of 5 mm and a length of 16 mm is heated at a temperature increase rate of 10° C./minute in a measurement temperature range of 0° C. to 180° C. by means of a thermal analyzer TMA Q400 (available from TA Instruments Japan, Inc.), whereby the in-plane thermal expansion rates of the sample are measured. Based on the measurement results, the in-plane thermal expansion rates in a temperature range of 25° C. to 180° C. are determined, and the average linear expansion coefficient is calculated based on the inclination of a graph.

The average linear expansion coefficient of the adhesive agent layer can be adjusted not only by selecting the formulation of the adhesive agent (e.g., the types of the base resin, the curing agent, and other components), but also by introducing a rigidity component such as aromatic ring into a resin skeleton, by controlling the molecular weight to increase the crosslinking density, or by adding a filler or a plasticizer.

<<Glass Transition Temperature (Tg)>>

In this embodiment, the adhesive agent layer typically has a glass transition temperature (Tg) of not lower than −130° C., preferably not lower than −110° C., more preferably not lower than −80° C., still more preferably not lower than −70° C., particularly preferably not lower than −60° C.

Further, the glass transition temperature (Tg) of the adhesive agent layer is typically not higher than 190° C., preferably not higher than 170° C., more preferably not higher than 150° C., still more preferably not higher than 130° C.

Where the glass transition temperature (Tg) of the adhesive agent layer of the laminate according to this embodiment falls within the aforementioned range, it is possible to reduce a stress occurring due to the linear expansion coefficient difference between the adherends bonded together via the adhesive agent layer during the cooling of the laminate after the curing of the adhesive agent. Thus, the warpage can be reduced.

The glass transition temperature of the adhesive agent layer can be determined based on a tan δ peak in the measurement of the viscoelasticity.

The glass transition temperature of the adhesive agent layer can be adjusted not only by selecting the formulation of the adhesive agent (e.g., the types of the base resin, the curing agent, and other components), but also by introducing a heat resistant structure such as aromatic ring or double bond into the resin skeleton, by introducing a highly interactive polar group into the resin skeleton, or by controlling the molecular weight to increase the crosslinking density.

<<Thickness>>

In this embodiment, the adhesive agent layer preferably has a thickness of 0.1 to 2.0 mm. Where the thickness of the adhesive agent layer falls within the aforementioned numerical range, it is possible to improve the adhesion between the first material and the second material while reducing the warpage of the laminate.

Particularly, the thickness of the adhesive agent layer is preferably not less than 0.2 mm, more preferably not less than 0.3 mm, still more preferably not less than 0.4 mm, for the absorption of the linear expansion coefficient difference between the first material and the second material.

The tensile shear adhesive strength of the adhesive agent layer is increased, as the thickness of the adhesive agent layer is reduced. Therefore, the thickness of the adhesive agent layer is preferably not greater than 1.8 mm, more preferably not greater than 1.6 mm, still more preferably not greater than 1.4 mm.

<<Tensile Shear Adhesive Strength>>

In this embodiment, the adhesive agent cured in the laminate having the first material/adhesive agent layer/second material structure preferably has a tensile shear adhesive strength of not less than 10 MPa, more preferably not less than 15 MPa, still more preferably not less than 20 MPa. Where the tensile shear adhesive strength falls within the aforementioned numerical range, the adhesion between the first material and the second material is improved.

From the viewpoint of delamination requirements for the recycling of the laminate, the tensile shear adhesive strength of the adhesive agent layer is preferably not greater than 50 MPa, more preferably not greater than 45 MPa, still more preferably not greater than 40 MPa.

The tensile shear adhesive strength can be determined, for example, by a method specified in JIS K6850. More specifically, the tensile shear adhesive strength is determined in the following manner.

Two stainless steel plates (SUS) each having a width of 25 mm, a length of 100 mm, and a thickness of 1.6 mm are prepared. The adhesive agent is applied to a thickness of 0.05 to 0.20 mm in a region having a width of 25 mm and a length of 12.5 mm on one of the stainless steel plates. The stainless steel plates are press-bonded to each other via the resulting adhesive agent layer with the use of a clamp, and then the adhesive agent is heat-cured at 180° C. for 20 minutes. Thus, a test piece is prepared. The tensile shear adhesive strength of the test piece is measured at a rate of 5 mm/minute at 23° C. at 50% RH by means of a tensile tester (AUTOGRAPH AG-X available from Shimadzu Corporation).

<<Formulation of Adhesive Agent Layer>>

In this embodiment, the formulation of the adhesive agent layer is not particularly limited, as long as it has a warpage reduction index of not less than 30. However, an epoxy resin is preferably used as the base resin (main component) from the viewpoint of the adhesiveness of the adhesive agent layer to the first and second materials, and the durability and the heat resistance of the adhesive agent layer.

In the present disclosure, the term "main component" means that the component is contained in the highest proportion (mass %) among the components of the adhesive agent layer. The proportion of the main component present in the adhesive agent layer is preferably not less than 50 mass %, more preferably not less than 70 mass %, still more preferably not less than 80 mass %, particularly preferably not less than 90 mass %, and may be 100 mass %.

<Epoxy Resin>

Preferred examples of the epoxy resin to be used in this embodiment will hereinafter be described.

Examples of the epoxy resin include various types of epoxy resins such as alcohol type epoxy resin, bisphenol-A type epoxy resin, bisphenol-F type epoxy resin, naphthalene type epoxy resin, phenol novolak type epoxy resin, cresol novolak type epoxy resin, biphenyl type epoxy resin, triphenylmethane type epoxy resin, dicyclopentadiene type epoxy resin, glycidyl ester type epoxy resin, glycidylamine type epoxy resin, polyfunctional phenol type epoxy resin, and aliphatic epoxy resin.

In this embodiment, these exemplary epoxy resins may each be used alone, or two or more of these epoxy resins may be used in desired combination at desired ratio.

In this embodiment, an epoxy resin having at least one skeleton selected from phenyl skeleton (phenol skeleton), naphthalene skeleton, fluorene skeleton, biphenyl skeleton, anthracene skeleton, pyrene skeleton, xanthene skeleton, adamantane skeleton, and dicyclopentadiene skeleton is preferably used as the epoxy resin. From the viewpoint of heat resistance, an epoxy resin having at least one skeleton selected from phenyl skeleton, fluorene skeleton, and biphenyl skeleton is more preferred. From the viewpoint of easier manufacture and heat resistance, an epoxy resin having at least one skeleton selected from bisphenol-A skeleton, bisphenol-F skeleton, and biphenyl skeleton is more preferred.

The type and the skeleton of the epoxy resin can be confirmed by NMR (nuclear magnetic resonance spectroscopy), IR (infrared spectroscopy), SEM (scanning electron microscope) analysis, IPC (high-frequency inductively coupled plasma) emission spectroscopic analysis, TGA (thermogravimetric analysis), DSC (differential scanning calorimetry), and various chromatography analyses.

In this embodiment, the epoxy resin more preferably contains an epoxy resin prepared from an epoxy resin precursor and a curing agent shown below, out of the aforementioned epoxy resins.

(Epoxy Resin Precursor)

In this embodiment, the epoxy resin precursor contains at least one epoxy compound from which the epoxy resin can be prepared by curing. The epoxy compound is a compound which has an epoxy group in its molecule and can provide a thermosetting resin by an addition reaction or a self-polymerization reaction in the presence of at least one selected from a curing agent and a curing catalyst to be described later.

Examples of the epoxy compound include: bifunctional aromatic epoxy compounds such as bisphenol compounds including bisphenol-A, bisphenol-F, bisphenol-B, bisphenol-C, bisphenol-AD, and bisphenol acetophenone, and bifunctional phenolic epoxy compounds each having a skeleton such as of biphenol, catechol, resorcin, hydroquinone or dihydroxynaphthalene; bifunctional aliphatic epoxy compounds such as bifunctional glycidyl ether type epoxy compounds, bifunctional glycidyl ester type epoxy compounds, bifunctional glycidylamine type epoxy compounds, and bifunctional linear aliphatic epoxy compounds; bifunctional alicyclic epoxy compounds; bifunctional heterocyclic epoxy compounds; and hydrogenated epoxy compounds such as hydrogenated bisphenol-A epoxy compounds.

In this embodiment, these exemplary epoxy compounds may each be used alone as the epoxy resin precursor, or two or more of these epoxy compounds may be used in desired combination at desired ratio.

In this embodiment, the epoxy resin precursor preferably contains one or more compounds including any of the exemplary epoxy compounds described above.

From the viewpoint of the flexibility of the resulting epoxy resin, at least one of the bifunctional aliphatic epoxy compounds is preferably used as the epoxy resin precursor.

In this embodiment, the epoxy resin precursor preferably contains a bifunctional aliphatic epoxy compound and an aromatic compound.

Usable as the bifunctional aliphatic epoxy compound is an aliphatic epoxy compound prepared by causing a C2 to C12 diol and epichlorohydrin to react with each other, and then purifying the resulting product to a diglycidyl ether purity of not less than 90 mass % by distillation.

Examples of the bifunctional aliphatic epoxy compound include glycidyl ether of ethylene glycol, glycidyl ether of propylene glycol, glycidyl ether of 1,4-butanediol, glycidyl ether of 1,6-hexanediol, glycidyl ether of 1,8-octanediol, glycidyl ether of 1,10-decanediol, glycidyl ether of 2,2-dimethyl-1,3-propanediol, glycidyl ether of diethylene glycol, glycidyl ether of triethylene glycol, glycidyl ether of tetraethylene glycol, glycidyl ether of hexaethylene glycol, and glycidyl ether of 1,4-cyclohexanedimethanol.

Of these, the glycidyl ether of 1,4-butanediol, the glycidyl ether of 1,6-hexanediol, the glycidyl ether of 1,4-cyclohexanedimethanol, and the glycidyl ether of 2,2-dimethyl-1,3-propanediol are preferred, because a viscosity reducing effect for the epoxy resin precursor is enhanced and the resulting cured product is less susceptible to reduction in heat resistance.

Examples of the aromatic compound include bisphenol compounds such as bisphenol-A, bisphenol-F, bisphenol-B, bisphenol-C, bisphenol-AD, and bisphenol acetophenone, and compounds each having a skeleton such as of biphenol, catechol, resorcin, hydroquinone or dihydroxynaphthalene.

Of these, at least one of bisphenol-A and bisphenol-F is preferably used from the viewpoint of the rigidity and the heat resistance of the resulting epoxy resin.

In this embodiment, the epoxy resin precursor preferably contains the bifunctional aliphatic epoxy compound and at least one of bisphenol-A and bisphenol-F.

In this embodiment, where the epoxy resin precursor contains two or more compounds including any of the epoxy compounds, the two or more compounds are preferably mixed together and/or are caused to react with each other for use as the epoxy resin precursor. The two or more compounds are more preferably mixed with a polymerization initiator and polymerized for use as the epoxy resin precursor.

Usable as the polymerization initiator are those to be used as the curing agent for curing the epoxy resin precursor. Particularly, thermal polymerization initiators such as phosphonium salt, sulfonium salt, benzothiazonium salt, and ammonium salt are preferred, and the phosphonium salt is more preferred.

That is, the epoxy resin precursor to be used in this embodiment is preferably an epoxy resin precursor prepared by mixing any of the aforementioned bifunctional aliphatic epoxy compounds and any of the aforementioned aromatic compounds with any of the aforementioned polymerization initiators and polymerizing the mixed compounds, and is more preferably an epoxy resin precursor prepared by mixing any of the bifunctional aliphatic epoxy compounds and at least one of bisphenol-A and bisphenol-F with any of the polymerization initiators and polymerizing the mixed compounds.

In this embodiment, therefore, the epoxy resin precursor particularly preferably contains a bifunctional epoxy compound having both an aliphatic skeleton and an aromatic skeleton.

(Average Molecular Weight)

In this embodiment, the molecular weight of the epoxy resin precursor is not particularly limited.

The molecular weight of the epoxy resin precursor is typically not less than 100, preferably not less than 200, more preferably not less than 300, as measured as a mass average molecular weight (Mw) by gel permeation chromatography (GPC) based on polystyrene standard. Further, the molecular weight of the epoxy resin precursor is typically not greater than 200,000, preferably not greater than 100,000, more preferably not greater than 50,000.

The number average molecular weight (Mn) of the epoxy resin precursor is typically not less than 100, preferably not less than 200, more preferably not less than 300. Further, the number average molecular weight of the epoxy resin precursor is typically not greater than 100,000, preferably not greater than 80,000, more preferably not greater than 50,000.

Where the molecular weights of the epoxy resin precursor fall within the aforementioned ranges, the solubilities of the components of the epoxy resin precursor and the curing agent are increased. Therefore, the viscosity and other physical properties of the adhesive agent can be adjusted so as to ensure easy handling of the adhesive agent in an ordinary manufacturing facility, thereby advantageously improving the adhesiveness of the adhesive agent.

(Epoxy Group Equivalent)

In this embodiment, the epoxy group equivalent (or epoxy equivalent) of the epoxy resin precursor can be measured by a method specified in JIS K7236.

The epoxy group equivalent of the epoxy resin precursor is typically not less than 50, preferably not less than 80, more preferably not less than 100, more preferably not less than 120, particularly preferably not less than 150. Further, the epoxy group equivalent of the epoxy resin precursor is typically not greater than 100,000, preferably not greater than 10,000, more preferably not greater than 3,000, still more preferably not greater than 1,500, particularly preferably not greater than 1,000.

Where the epoxy equivalent of the epoxy resin precursor is not greater than 100,000, the amount of epoxy groups and the amount of hydroxyl groups generated by the reaction are increased and, therefore, the interaction of the adhesive agent with the first material and the second material as the adherends is increased, thereby increasing the adhesiveness of the adhesive agent after the curing.

Where the epoxy equivalent of the epoxy resin precursor is not less than 50, on the other hand, the crosslinking density is reduced, thereby increasing the flexibility and the stretchability. This improves the warpage reducing effect of the laminate.

The epoxy group equivalent of the epoxy resin precursor can be adjusted by reducing the polymerization degree of the epoxy resin skeleton, or by introducing a smaller-molecular weight skeleton into the epoxy resin skeleton.

(Viscosity)

In this embodiment, the epoxy resin precursor preferably has a viscosity of not less than 0.01 Pa·S, more preferably not less than 0.05 Pa·S, particularly preferably not less than 0.1 Pa·S, as measured at 25° C. at 1 atm. Further, the viscosity of the epoxy resin precursor is preferably not greater than 10,000 Pa·S, more preferably not greater than 8,000 Pa·S, particularly preferably not greater than 5,000 Pa·S.

Where the viscosity of the epoxy resin precursor is not greater than 10,000 Pa·S, the impregnation property of the adhesive agent with respect to a support base can be improved. Where the viscosity of the epoxy resin precursor is not less than 0.01 Pa·S, the adhesive agent can be formed into a sheet with an improved handlability, and can be prevented from being fluidized during the production of the laminate.

The viscosity of the epoxy resin precursor can be determined at 25° C. by means of a B-type rotary viscometer (Brookfield viscometer).

The viscosity of the epoxy resin precursor can be adjusted by reducing the molecular weight of the epoxy resin precursor through the control of the number of repeating units or the like, or by reducing the amount of polar groups in the unit structure.

(Curing Agent)

Usable as the curing agent in this embodiment are a heat-curing agent which initiates the reaction by heat, and a photo-curing agent which initiates the reaction by light.

The curing agent may be properly selected from known curing agents according to the method of curing the adhesive agent in the laminate of this embodiment. Where a photo-curing method is employed, for example, a photo-curing agent (photo-polymerization initiator) may be selected. Where a heat-curing method is employed, a heat-curing agent (heat-polymerization initiator) may be selected. In the photo-curing method, at least one selected from ultraviolet radiation, visible radiation, and infrared radiation is used as active energy radiation for the curing.

In this embodiment, where it is desirable to cure the epoxy resin precursor in an environment in which light irradiation is difficult, the heat-curing method is preferably employed for the curing. In this embodiment, it is preferred to use the heat-curing agent or to use the heat-curing agent and the photo-curing agent in combination.

=Heat-curing Agent= Examples of the heat-curing agent to be used in this embodiment include: phenolic curing agents; amine curing agents such as aliphatic amines, polyether amines, alicyclic amines, and aromatic amines; acid anhydride curing agents; amide curing agents; urea curing agents; tertiary amines; imidazole and its derivatives; organic phosphines; phosphonium salts; tetraphenylboron salts; organic acid dihydrazides; halogenated boron-amine complexes; polymercaptan curing agents; isocyanate curing agents; and blocked isocyanate curing agents.

Of the aforementioned heat-curing agents, the phenolic curing agents, the amine curing agents, the acid anhydride curing agents, and the like each react with the epoxy resin precursor to be thereby incorporated into the skeleton of the epoxy resin.

In this embodiment, therefore, the amount of the curing agent to be blended with the epoxy resin is most preferably such that the total amount of the epoxy groups and other active parts (active hydrogen parts and acid anhydride parts) is equal to the chemical equivalent (1.0) of the curing agent, but the amount of the curing agent may be properly adjusted so as to control the viscosity, the reaction rate, and the physical properties after the curing. In this case, the amount of the curing agent is preferably not less than 0.4 chemical equivalents, more preferably not less than 0.5 chemical equivalents, still more preferably not less than 0.6 chemical equivalents, based on the amount of the epoxy groups. Further, the amount of the curing agent is preferably not greater than 5.0 chemical equivalents, more preferably not greater than 4.0 chemical equivalents, still more preferably not greater than 3.0 chemical equivalents, based on the amount of the epoxy groups.

Where the amount of the curing agent falls within the aforementioned range, the epoxy resin is free from the bleed-out of unreacted components during use and an insufficient crosslinking density, and is advantageously improved in heat resistance and moisture resistance.

In general, curing agents other than the phenolic curing agents, the amine curing agents, and the acid anhydride curing agents each mainly function as a curing catalyst or an auxiliary catalyst for the curing agent in the self-polymerization of the epoxy resin precursor.

The amount of such a curing agent to be blended is preferably not less than 0.01 part by mass, more preferably not less than 0.05 parts by mass, more preferably not less than 0.1 part by mass, based on 100 parts by mass of the epoxy resin precursor. Further, the amount of the curing agent to be blended is preferably not greater than 20 parts by mass, more preferably not greater than 15 parts by mass, still more preferably not greater than 10 parts by mass, based on 100 parts by mass of the epoxy resin precursor.

Where the amount of the curing agent to be blended is not less than 0.01 part by mass, the curing reaction of the epoxy resin precursor is promoted. Where the amount of the curing agent to be blended is not greater than 20 parts by mass, the resin composite material is less susceptible to deterioration in heat resistance, moisture resistance, and other physical properties, and the bleed-out of the catalyst during use, which may otherwise occur due to a residue of the curing agent.

Phenolic Curing Agents—Examples of the phenolic curing agents include bisphenol-A, bisphenol-F, 4,4'-dihydroxydiphenylmethane, 4,4'-dihydroxydiphenyl ether, 1,4-bis(4-hydroxyphenoxy)benzene, 1,3-bis(4-hydroxyphenoxy)benzene, 4,4'-dihydroxydiphenyl sulfide, 4,4'-dihydroxydiphenyl ketone, 4,4'-dihydroxydiphenyl sulfone, 4,4'-dihydroxybiphenyl, 2,2'-dihydroxybiphenyl, 10-(2,5-dihydroxyphenyl)-10H-9-oxa-10-phosphaphenanthrene-10-oxide, phenol novolak, bisphenol-A novolak, o-cresol novolak, m-cresol novolak, p-cresol novolak, xylenol novolak, poly-p-hydroxystyrene, hydroquinone, resorcin, catechol, t-butylcatechol, t-butylhydroquinone, fluoroglycinol, pyrogallol, t-butylpyrogallol, allylated pyrogallol, polyallylated pyrogallol, 1,2,4-benzenetriol, 2,3,4-trihydroxybenzophenone, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,4-dihydroxynaphthalene, 2,5-dihydroxynaphthalene, 2,6-dihydroxynaphthalene, 2,7-dihydroxynaphthalene, 2,8-dihydroxynaphthalene, allylation products and polyallylation products of the aforementioned dihydroxynaphthalenes, allylated bisphenol-A, allylated bisphenol-F, allylated phenol novolak, and allylated pyrogallol.

Amine Curing Agents—Usable as the amine curing agents are aliphatic amines, polyetheramines, alicyclic amines, and aromatic amines.

Examples of the aliphatic amines include ethylenediamine, 1,3-diaminopropane, 1,4-diaminopropane, hexamethylenediamine, 2,5-dimethylhexamethylenediamine, trimethylhexamethylenediamine, diethylenetriamine, iminobispropylamine, bis(hexamethylene)triamine, triethylenetetramine, tetraethylenepentamine, pentaethylenehexamine, N-hydroxyethylethylenediamine, and tetra(hydroxyethyl)ethylenediamine.

Examples of the polyetheramines include triethylene glycoldiamine, tetraethylene glycoldiamine, diethylene glycol bis(propylamine), polyoxypropylenediamine, and polyoxypropylenetriamine.

Examples of the alicyclic amines include isophoronediamine, mensendiamine, N-aminoethylpiperazine, bis(4-amino-3-methyldicyclohexyl)methane, bis(aminomethyl) cyclohexane, 3,9-bis(3-aminopropyl)-2,4,8,10-tetraoxaspiro (5,5)undecane, and norbornenediamine.

Examples of the aromatic amines include tetrachloro-p-xylenediamine, m-xylenediamine, p-xylenediamine, m-phenylenediamine, o-phenylenediamine, p-phenylenediamine, 2,4-diaminoanisole, 2,4-toluenediamine, 2,4-diaminodiphenylmethane, 4,4'-diaminodiphenylmethane, 4,4'-diamino-1, 2-diphenylethane, 2,4-diaminodiphenyl sulfone, 4,4'-diaminodiphenyl sulfone, m-aminophenol, m-aminobenzylamine, benzyldimethylamine, 2-(dimethylaminomethyl)phenol, triethanolamine, methylbenzylamine, α-(m-aminophenyl)ethylamine, α-(p-aminophenyl)ethylamine, diaminodiethyldimethyldiphenylmethane, and α,α'-bis(4-aminophenyl)-p-diisopropylbenzene.

Acid Anhydride Curing Agents—Examples of the acid anhydride curing agents include dodecenylsuccinic anhydride, polyadipic anhydride, polyazelaic anhydride, polysebacic anhydride, poly(ethyloctadecanedioic) anhydride, poly(phenylhexadecanedioic) anhydride, methyltetrahydrophthalic anhydride, methylhexahydrophthalic anhydride, hexahydrophthalic anhydride, methylhymic anhydride, tetrahydrophthalic anhydride, trialkyltetrahydrophthalic anhydride, methylcyclohexenedicarboxylic anhydride, methylcyclohexenetetracarboxylic anhydride, phthalic anhydride, trimellitic anhydride, pyromellitic anhydride, benzophenonetetracarboxylic anhydride, ethylene glycol bistrimellitate dianhydride, HET anhydride, nadic anhydride, methylnadic anhydride, 5-(2,5-dioxotetrahydro-3-furanyl)-3-methyl-3-cyclohexane-1,2-dicarboxylic anhydride, 3,4-dicarboxy-1,2,3,4-tetrahydro-1-naphthalenesuccinic dianhydride, and 1-methyl-dicarboxy-1,2,3,4-tetrahydro-1-naphthalenesuccinic dianhydride.

Amide Curing Agents—Examples of the amide curing agents include dicyandiamide and polyamide resins.

Urea Curing Agents—Examples of the urea curing agents include urea compounds such as 3-(3,4-dichlorophenyl)-1,1-dimethylurea, 3-phenyl-1,1-dimethylurea, toluenebis(dimethylurea), and 4,4'-methylenebis(phenyldimethylurea).

Tertiary Amines—Examples of the tertiary amines include 1,8-diazabicyclo(5,4,0)undecene-7, triethylenediamine, benzyldimethylamine, triethanolamine, dimethylaminoethanol, and tris(dimethylaminomethyl) phenol.

Imidazole and its Derivatives—Examples of imidazole and its derivatives include 1-cyanoethyl-2-phenylimidazole, 2-phenylimidazole, 2-ethyl-4(5)-methylimidazole, 2-phenyl-4-methylimidazole, 1-benzyl-2-methylimidazole, 1-benzyl-2-phenylimidazole, 1-cyanoethyl-2-undecylimidazole, 1-cyano-2-phenylimidazole, 1-cyanoethyl-2-undecylimidazole trimellitate, 1-cyanoethyl-2-phenylimidazolium trimellitate, 2,4-diamino-6-[2'-methylimidazolyl-(1')]-ethyl-s-triazine, 2,4-diamino-6-[2'-ethyl-4'-methylimidazolyl-(1')]-ethyl-s-triazine, 2,4-diamino-6-[2'-methylimidazolyl-(1')]-ethyl-s-triazine isocyanuric acid adduct, 2-phenylimidazole isocyanuric acid adduct, 2-phenyl-4,5-dihydroxymethylimidazole, and 2-phenyl-4-methyl-5-hydroxymethylimidazole, and compounds prepared by adding any of these imidazoles to epoxy compounds.

Organic Phosphines—Examples of the organic phosphines include tributylphosphine, methyldiphenylphosphine, triphenylphosphine, diphenylphosphine, and phenylphosphine.

Phosphonium Salts—Examples of the phosphonium salts include tetraphenylphosphonium tetraphenylborate, tetraphenylphosphonium ethyltriphenylborate, and tetrabutylphosphonium tetrabutylborate.

Tetraphenylboron Salts—Examples of the tetraphenylboron salts include 2-ethyl-4-methylimidazole tetraphenylborate and N-methylmorpholine tetraphenylborate.

=Photo-Curing Agents=Examples of the photo-curing agents to be used in this embodiment include acetophenones, benzophenones, benzoin ethers, hydroxyketones, acylphosphine oxides, diazonium cation onium salts, iodonium cation onium salts, and sulfonium cation onium salts.

Specific examples of the photo-curing agents include 1-[4-(2-hydroxyethoxy)phenyl]-2-hydroxy-2-methyl-1-propan-1-one, 1-hydroxycyclohexyl phenyl ketone, 2,2-dimethoxy-1,2-diphenylethan-1-one, 2,4,6-trimethylbenzoyldiphenylphosphine oxide, 2,4,6-trimethylbenzoylphenylethoxyphosphine oxide, 2-benzyl-2-dimethylamino-1-(4-morpholinophenyl)butanone-1,2-hydroxy-2-methyl-1-phenylpropan-1-one, 2-[methyl-1-(4-methylthio)phenyl]-2-morpholinopropan-1-one, benzoin methyl ether, benzoin ethyl ether, benzoin isobutyl ether, benzoin isopropyl ether, bis(2,4,6-trimethylbenzoyl) phenylphosphine oxide, 2-hydroxy-2-methyl-[4-(1-methylvinyl)phenyl]propanol oligomers, isopropylthioxanthone, methyl o-benzoylbenzoate, [4-(methylphenylthio)phenyl] phenylmethane, 2,4-diethylthioxanthone, 2-chlorothioxanthone, benzophenone, ethylanthraquinone, benzophenone ammonium salts, thioxanthone ammonium salts, bis(2,6-dimethoxybenzoyl)-2,4,4-trimethylpentylphosphine oxide, 2,4,6-trimethylbenzophenone, 4-methylbenzophenone, 4,4'-bisdiethylaminobenzophenone, 1,4-dibenzoylbenzene, 10-butyl-2-chloroacridone, 2,2'-bis(o-chlorophenyl)-4,5,4', 5'-tetrakis(3,4,5-trimethoxyphenyl)-1,2'-biimidazole, 2,2'-bis(o-chlorophenyl)-4,5,4',5'-tetraphenyl-1,2'-biimidazole, 2-benzoylnaphthalene, 4-benzoylbiphenyl, 4-benzoyldiphenyl ether, acrylated benzophenone, dibenzoyl, bis(15-2,4-cyclopentadien-1-yl)-bis(2,6-difluoro-3-(1H-pyrrol-1-yl) phenyl)titanium, o-methylbenzoyl benzoate, p-dimethylaminobenzoic acid ethyl ester, p-dimethylaminobenzoic acid isoamylethyl ester, active tertiary amines, carbazole/phenone photopolymerization initiators, acridine photopolymerization initiators, triazine photopolymerization initiators, benzoyl, triallylsulfonium hexafluorophosphate salts, hexafluorophosphorus aromatic sulfonium salts, hexafluoroantimony aromatic sulfonium salts, triallylsulfonium hexafluoroantimony, 4-methylphenyl[4-(2-methylpropyl)phenyl]iodonium hexafluorophosphate, 1,2-octanedione, 1-[4-(phenylthio)-2-(o-benzoyloxime)], 1-[9-ethyl-6-(2-methylbenzoyl)-9H-carbazol-3-yl]-1-(o-acetyloxime), ethyl-4-dimethylaminobenzoate, 2-ethylhexyl-4-dimethylaminobenzoate, (9-oxo-9H-xanthen-2-yl)phenyliodonium hexafluorophosphate, bis[4-n-alkyl(C10-C13)phenyl]iodonium hexafluorophosphate, bis[4-n-alkyl(C10-C13)phenyl] iodonium hexafluoroantimony, triphenylsulfonium trifluorosulfonate, triphenylsulfonium bicyclo[2.2.1]heptane-1-methanesulfonate, (9-oxo-9H-xanthen-2-yl) phenylsulfonium hexafluorophosphate, p-azidobenzaldehyde, p-azidoacetophenone, p-azidobenzoic acid, p-azidobenzaldehyde-2-sulfonic acid sodium salt, p-azidobenzalacetophenone, 4,4'-diazidochalcone, 4,4'-diazidodiphenyl sulfide, 3,3'-diazidodiphenyl sulfide, 2,6-bis(4'-azidobenzal)-4-methylcyclohexane, 1,3-bis(4'-azidobenzal)propanone, 4,4'-diazidochalcone-2-sulfonic acid sodium salt, 4,4'-diazidostilbene-2,2'-disulfonic acid sodium salt, 1,3'-bis(4'-azidobenzal)-2'-disulfonic acid sodium salt-2-propanone, 2,6-bis(4'-azidobenzal)-2'-sulfonic acid (sodium salt) cyclohexanone, 2,6-bis(4'-azidobenzal)-2'-sulfonic acid (sodium salt) 4-methylcyclohexanone, α-cyano-4,4'-dibenzostilbene, 2,5-bis(4'-azidobenzalsulfonic acid sodium salt) cyclopentanone, 3-sulfonylazidobenzoic acid, 4-sulfonylazidobenzoic acid, cinnamic acid, α-cyanocinnamylideneacetonic acid, p-azido-α-cyanocinnamic acid, p-phenylenediacrylic acid, p-phenylenediacrylic acid diethyl ester, polyvinyl cinnamate, polyphenoxyisopropyl cinnamylideneacetate, polyphenoxyisopropyl α-cyanocinnamylideneacetate, naphthoquinone(1,2)diazido(2)-4-sulfonic acid sodium salt, naphthoquinone(1,2)diazido(2)-5-sulfonic acid sodium salt, naphthoquinone(1,2)diazido(2)-5-sulfonic acid ester (I), naphthoquinone(1,2)diazido(2)-5-sulfonic acid ester (II), naphthoquinone(1,2)diazido(2)-4-sulfonic acid salts, 2,3,4,4'-tetrahydroxybenzophenone tri (naphthoquinonediazidesulfonic acid) ester, naphthoquinone 1,2,5-(trihydroxybenzophenone) triester, 1,4-iminoquinone-diazido(4)-2-sulfamide (I), 1-diazo-2,5-diethoxy-4-p-trimercaptobenzene salts, 5-nitroacenaphthene, N-acetylamino-4-nitronaphthalene, organoboron compounds, other photoacid generators which each generate cation when being irradiated, and other photobase generators which each generate anion when being irradiated.

In this embodiment, these exemplary curing agents may each be used alone, or two or more of these curing agents may be used in desired combination at desired ratio.

The curing agent may be used in the form of complex with a solvent or the like. Further, the curing agent may be used in the form of oligomer.

The curing agent may be completely or partly decomposed, or may not be decomposed in the produced laminate.

Particularly Preferred Embodiments

Particularly preferred embodiments will hereinafter be described.

(a) Method in which the Epoxy Resin is Selected as the Base Resin of the Adhesive Agent, and a Molecular Skeleton for Imparting the Epoxy Resin with Flexibility is Introduced into the Main Chain of the Epoxy Resin In the molecular skeleton introduction method, an epoxy resin precursor having a polyoxyalkylene skeleton, an acrylic skeleton, a silicone skeleton, a polyester skeleton, a urethane skeleton or the like can be used.

A commercially available flexible epoxy resin precursor is usable as the epoxy resin precursor. Specific examples of the commercially available flexible epoxy resin precursor include jER871 (available from Mitsubishi Chemical Corporation), jER872 (available from Mitsubishi Chemical Corporation), YX7105 (available from Mitsubishi Chemical Corporation), YL7175-1000 (available from Mitsubishi Chemical Corporation), YL7410 (available from Mitsubishi Chemical Corporation), urethane-modified epoxy resin, CTBN-modified BPA type epoxy resin, EO-modified BPA type epoxy resin, EPICLON EXA-4816 (available from DIC Corporation), EPICLON EXA-4850 (available from DIC Corporation), EPICLON TSR-960 (available from DIC Corporation), EPICLON TSR-601 (available from DIC Corporation), EPICLON 1650-75MPX (available from DIC Corporation), RIKARESIN BEO-60E (available from New Japan Chemical Co. Ltd.), RIKARESIN BEO-20E (available from New Japan Chemical Co. Ltd.), and RIKARESIN DME-100 (available from New Japan Chemical Co. Ltd.)

(b) Method in which the Epoxy Resin is Selected as the Base Resin of the Adhesive Agent, and a Plasticizer or a Reactive Diluent is Added to the Epoxy Resin The plasticizer to be used in the method (b) is not particularly limited, but an ester compound synthesized from an acid and an alcohol, for example, may be used as the plasticizer. Examples of the acid to be used include phthalic acid, tetrahydrophthalic acid, hexahydrophthalic acid, trimellitic acid, pyromellitic acid, adipic acid, sebacic acid, azelaic acid, maleic acid, itaconic acid, phosphoric acid, citric acid, epoxycyclohexyl dicarboxylic acid, and benzoic acid.

Further, an epoxy group may be introduced into the plasticizer, making it possible to prepare a homogeneous composition while suppressing the bleed-out of the plasticizer. Examples of such a compound include SANSOCIZER E-PS, SANSOCIZER E-PO, SANSOCIZER E-4030, SANSOCIZER E-6000, SANSOCIZER E-2000H, and SANSOCIZER E-9000H (each available from New Japan Chemical Co. Ltd.), epoxidized soybean oil, epoxidized linseed oil, epoxidized fatty acid octyl ester and other epoxidized fatty acid alkyl esters, and ADEKACIZER (available from ADEKA Corporation).

Examples of the reactive diluent to be used in the method (b) include YED series (YED111N, YED111AN, YED122, YED188, YED216M, YED216D, and the like) available from Mitsubishi Chemical Corporation, PG-207N (available from Nippon Steel Corporation), NEOTOHTO S (available from Nippon Steel Corporation), DENACOL Series (available from Nagase ChemteX Corporation), CELLOXIDE 2021P, 2081, and 2000 (available from Daicel Corporation).

(c) Method in which the Epoxy Resin is Selected as the Base Resin of the Adhesive Agent, and an Elastomer or a Thermoplastic Resin is Added as the Modifier to the Epoxy Resin Examples of the elastomer and the thermoplastic resin to be added as the modifier in the method (c) include polyester, acryl-modified epoxy resin, polyamide, epoxidized vegetable oil, polyvinyl butyral, polyvinyl acetal, modified polyvinyl butyral, modified polyvinyl acetal, silicone oil, and MQ resin.

Of the aforementioned exemplary methods, the method (a) in which the molecular skeleton for imparting the epoxy resin with flexibility is introduced into the main chain of the epoxy resin is preferably used to control the storage elastic modulus of the epoxy resin in the desired range.

<Other Ingredients to be Added to Adhesive Agent>

In this embodiment, the adhesive agent may optionally contain various additives in addition to the epoxy resin. Examples of the additives include a resin other than the above epoxy resin, filler (filling agent), dispersant, surfactant, plasticizer, antioxidant, pigment, coupling agent, diluent, flexibilizing agent, wetting agent, colorant, UV absorber, light stabilizer such as of hindered amine type, defoaming agent, release agent, fluidity adjusting agent, and solvent.

The amount of the additives to be added is preferably not greater than 20 parts by mass based on 100 parts by mass of the sum of the epoxy resin precursor and the curing agent. The lower limit of the amount of the additives is not particularly limited, but is preferably not less than 0.1 part by mass.

(Filler)

In this embodiment, the adhesive agent may contain the filler (filling agent). Examples of the filler include powdery reinforcing agent and filling agent.

Specific examples of the filler include: metal oxides such as aluminum oxide and magnesium oxide; metal carbonates such as calcium carbonate and magnesium carbonate; silicon compounds such as diatomite powder, basic magnesium silicate, baked clay, fine silica power, and fused silica; metal hydroxides such as aluminum hydroxide; and kaolin, mica, quartz powder, graphite, carbon black, carbon nanotube, molybdenum disulfide, boron nitride, silicon nitride, and aluminum nitride.

A fibrous filler is also usable as the filler. Examples of the fibrous filler include glass fibers, ceramic fibers, carbon fibers, alumina fibers, silicon carbide fibers, boron fibers, aramid fibers, cellulose nanofibers, and cellulose nanocrystals.

A cloth or a nonwoven fabric of organic fibers or inorganic fibers is also usable as the filler.

Further, the aforementioned fillers may be surface-treated with a silane coupling agent, a titanate coupling agent or an aluminate coupling agent, or with a primer.

In the laminate according to this embodiment, the strain occurring due to the difference in linear expansion coefficient between the first material and the second material is relaxed by adjusting the formulation of the adhesive agent, the storage elastic modulus, the thickness, and the like of the adhesive agent layer. The present disclosure is different from the conventional art in which a filler added to an adhesive agent is thermally expanded to fill inter-component gaps. The present disclosure can reduce the warpage of the laminate without reducing the adhesive strength. In the conventional art, in contrast, it is difficult to satisfy the requirements for the adhesive strength and the laminate warpage reducing effect. Therefore, where it is desirable to satisfy the requirements for the adhesive strength and the laminate warpage reducing effect and the adhesive agent does not contain the filler (e.g., thermally expandable fine particles), the present disclosure can be particularly advantageously employed.

(Dispersant)

In this embodiment, the adhesive agent may contain the dispersant. The term "dispersant" means a compound which has an effect to homogeneously disperse the filler in the adhesive agent and in the produced laminate.

Examples of the dispersant include: polysiloxane compounds and salts thereof such as methylhydrogenpolysiloxane, polymethoxysilane, dimethylpolysiloxane, and dimethicone PEG-7 succinic acid salt; organic silicon compounds such as silane compounds (methyldimethoxysilane, dimethyldimethoxysilane, methyltrimethoxysilane, phenyltrimethoxysilane, dichlorophenylsilane, chlorotrimethylsilane, hexyltrimethoxysilane, octyltrimethoxysilane, decyltrimethoxysilane, dodecyltrimethoxysilane, dodecyltrichlorosilane, octadecyltrimethoxysilane, octadecyltrichlorosilane, trifluoropropyltrimethoxysilane, vinyltrimethoxysilane, 3-acryloxypropyltrimethoxysilane, 3-mercaptopropyltrimethoxysilane, 3-aminopropyltriethoxysilane, 3-(2-aminoethyl)aminopropyltrimethoxysilane, hexamethyldisiloxane, 1,1,1,3,3,3-hexamethyldisilazane, 3-carboxypropyltrimethyltrimethoxysilane, and the like); carboxylic acid compounds such as formic acid, acetic acid, butyric acid, lauric acid, stearic acid, oleic acid, and 6-hydroxyhexanoic acid; organic phosphorus compounds such as lauryl ether phosphoric acid and trioctylphosphine; amine compounds such as dimethylamine, tributylamine, trimethylamine, cyclohexylamine, ethylenediamine, and polyethyleneimine; and carboxylic acid amine compounds and phosphoric acid amine compounds.

The carboxylic acid amine compounds each have both a carboxyl group and an amino group as functional groups, and the phosphoric acid amine compounds each have both a phosphate group and an amino group as functional groups.

In this embodiment, these exemplary dispersants may each be used alone, or two or more of these dispersants may be used in desired combination at desired ratio for the adhesive agent. The surfactant to be described later may also function as the dispersant.

The dispersant may be completely or partly decomposed or may not be decomposed in the produced laminate.

(Surfactant)

In this embodiment, the adhesive agent may contain the surfactant. Where the adhesive agent contains the surfactant, it is possible to prevent the laminate from being dented or unevenly dried due to minute bubbles or adhesion of foreign matter during the production of the laminate.

The surfactant improves the wettability of the adhesive agent.

Known surfactants (cationic surfactants, anionic surfactants, and nonionic surfactants) are usable without particular limitation.

Particularly, a silicon-containing surfactant, a fluorine-containing surfactant, and an acetylene glycol surfactant are preferred.

Specific examples of the surfactant include nonionic surfactant TRITON X100 (available from Dow Chemical Company), fluorine-containing surfactant ZONYL FS300 (available from EI du Pont de Nemours Company), silicon-containing surfactants BYK-310, BYK-320, BYK-345 (available from BYK Chemicals Co. Ltd.), and acetylene glycol surfactants SURFYNOL 104, SURFYNOL 465 (available from Air Products and Chemicals, Inc.), and OLFINE EXP4036, OLFINE EXP4200 (available from Nisshin Chemical Industry, Co., Ltd.).

In this embodiment, these exemplary surfactants may each be used alone, or two or more of these surfactants may be used in desired combination at desired ratio.

The surfactant may be completely or partly decomposed, or may not be decomposed in the produced laminate.

<<Adhesive Agent Sheet>>

In this embodiment, the adhesive agent layer may be an adhesive agent sheet.

The adhesive agent sheet may be such that the adhesive agent is provided on a base film. Where the adhesive agent sheet is to be provided between the first material and the second material, the base film is removed from the sheet before use. Alternatively, the adhesive agent sheet may be a sheet prepared by impregnating a support base with the adhesive agent.

Where the adhesive agent is provided on the base film, examples of the base film include PET film, polyethylene film, polypropylene film, fluorine-containing film, and polyimide film, each subjected to a release treatment with silicone or melamine.

Where the support base is impregnated with the adhesive agent, examples of the support base include nonwoven fabric and porous material. Particularly, the nonwoven fabric is preferred.

The support base preferably has a density of not less than 0.05 g/cm$^3$, more preferably not less than 0.08 g/cm$^3$, still more preferably not less than 0.1 g/cm$^3$, in order to suppress the fluidization of the resin and ensure proper retention of the resin in the adhesive agent sheet when the laminate is produced by pressurization and in order to improve the adhesiveness of the adhesive agent layer while imparting the adhesive agent layer with rigidity.

Further, the density of the support base is preferably not greater than 1.0 g/cm$^3$, more preferably not greater than 0.9 g/cm$^3$, still more preferably not greater than 0.8 g/cm$^3$, for improvement of the impregnation with the resin in the adhesive agent sheet, for weight reduction of the laminate, and for improvement of interfacial adhesion.

The adhesive agent sheet preferably has a thickness of 0.1 to 2.0 mm. Where the thickness of the adhesive agent sheet falls within the aforementioned numerical range, it is possible to reduce the warpage of the laminate while improving the adhesion between the first material and the second material.

Particularly, the thickness of the adhesive agent sheet is preferably not less than 0.2 mm, more preferably not less than 0.3 mm, still more preferably not less than 0.4 mm. The tensile shear adhesive strength of the laminate is improved, as the thickness of the adhesive agent layer decreases. Therefore, the thickness of the adhesive agent sheet is preferably not greater than 1.8 mm, more preferably not greater than 1.6 mm, still more preferably not greater than 1.4 mm.

(3) Additional Layer

In this embodiment, the laminate may include an additional layer in addition to the first material, the second material, and the adhesive agent layer.

For example, the laminate may further include a third material having a linear expansion coefficient different from those of the first material and the second material, and may have a structure such that the first material, a first adhesive agent layer, the second material, a second adhesive agent layer, and the third material are laminated in this order.

In this case, either of the first adhesive agent layer and the second adhesive agent layer may contain an adhesive agent having a warpage reduction index of not less than 30, and both of the first adhesive agent layer and the second adhesive agent layer preferably contain an adhesive agent having a warpage reduction index of not less than 30. The first adhesive agent layer and the second adhesive agent layer may be the same or different.

2. Laminate Production Methods

A production method for a laminate according to one embodiment of the present invention (hereinafter referred to as "first laminate") includes: a sheet forming step of forming the aforementioned adhesive agent having a warpage reduction index of not less than 30 into a sheet to provide the adhesive agent sheet; a laminating step of preparing the first material and the second material having different linear expansion coefficients and laminating the adhesive agent sheet between the first material and the second material; and a curing step of heat-curing the adhesive agent sheet.

A production method for a laminate according to another embodiment of the present invention (hereinafter referred to as "second laminate") includes: a direct application step of preparing the first material and the second material having different linear expansion coefficients and directly applying the aforementioned adhesive agent having a warpage reduction index of not less than 30 to a surface of at least one of the first material and the second material to form an adhesive agent layer; a laminating step of laminating the first material and the second material via the adhesive agent layer; and a curing step of heat-curing the adhesive agent layer.

The respective steps will hereinafter be described.

(1) Sheet Forming Step

In the sheet forming step, the adhesive agent is formed into a sheet to provide the adhesive agent sheet.

A sheet forming method is such that the base film is laminated or coated with the adhesive agent to provide a laminate of a base film/adhesive agent/base film structure. Specifically, examples of the sheet forming method include a method utilizing a sheet forming apparatus such as extrusion laminator (with a T-die or the like), calender roll or double belt press, comma coating method, gravure coating method, reverse coating method, knife coating method, dip coating method, spray coating method, air knife coating method, spin coating method, roll coating method, printing method, dipping method, slide coating method, curtain coating method, die coating method, casting method, bar coating method, and extrusion coating method.

In the sheet forming step, an impregnation step of impregnating the support base with the adhesive agent may be performed.

A known adhesive agent impregnation method may be employed in the impregnation step. Examples of the impregnation method include: laminating method in which base films each provided with the adhesive agent in the sheet forming step and the support base, for example, are laminated together to provide a laminate of a base film/adhesive agent/support base/adhesive agent/base film structure, and then the resulting laminate is pressed by means of a vacuum laminator, a calender roll, a double belt press or the like to impregnate the support base with the adhesive agent; and dip/nip method, kiss coating method, spraying method, and curtain coating method by which the support base is directly impregnated with the adhesive agent.

The thickness of the support base and the amount of the adhesive agent to be used for the impregnation of the support base are preferably adjusted so that the adhesive agent sheet layer has a thickness of 0.1 to 2.0 mm.

(2) Direct Application Step

In the direct application step, the adhesive agent is applied to a surface of at least one of the first material and the second material. The adhesive agent may be applied to only one of the first material and the second material, or may be applied to both of the first material and the second material.

A known application method may be employed for the application of the adhesive agent. Examples of the application method include comma coating method, gravure coating method, reverse coating method, knife coating method, dip coating method, spray coating method, air knife coating method, spin coating method, roll coating method, printing method, dipping method, slide coating method, curtain coating method, die coating method, casting method, bar coating method, and extrusion coating method.

The amount of the adhesive agent to be applied is preferably adjusted so that the thickness of the adhesive agent layer is 0.1 to 2.0 mm.

(3) Laminating Step

In the laminating step for the first laminate, the adhesive agent sheet is provided between the first material and the second material, whereby the first material and the second material are bonded together.

A known laminating method may be employed for the first laminate. Where a laminate of a base film/adhesive agent/base film structure is used as the adhesive agent sheet, for example, one of the base films is removed from the laminate, and an exposed adhesive agent surface of the laminate is put on the first material. Then, the other base film is removed from the laminate, and the second material is put on an exposed adhesive agent surface of the laminate, whereby the first material and the second material are bonded together.

In the laminating step for the second laminate, the first material and the second material are laminated and bonded together via the adhesive agent layer.

A known laminating method may be employed for the second laminate. Where the adhesive agent is applied to a surface of the second material, for example, the second material is provided as the lowermost layer, and the first material is put on the adhesive agent application surface of the second material, whereby the first material and the second material are bonded together.

(4) Curing Step

In the curing step, the first laminate and the second laminate are each heated to cure the adhesive agent.

The type of the curing agent, the heating temperature, the heating period, and other conditions are properly selected according to the type of the resin contained in the adhesive agent, and the like. The reactivity can be increased, for example, by using a lower-molecular weight epoxy resin precursor or a highly active curing agent, by using two or more curing agents in combination, by heating at a higher temperature, or by heating for a longer period. The heating conditions are influenced by the curing agent and the like to be used, but the heating temperature is typically not lower than 30° C., preferably not lower than 50° C., more preferably not lower than 60° C., still more preferably not lower than 80° C. Further, the heating temperature is typically not higher than 400° C., preferably not higher than 300° C., more preferably not higher than 250° C., still more preferably not higher than 200° C. Where the curing temperature falls within the above range, it is possible to easily produce a high quality laminate in a short period of time while effectively reducing the warpage of the laminate.

3. Use Applications

The laminates of the present disclosure each include a plurality of materials having different linear expansion coefficients and laminated together, and yet are less liable to warp. Therefore, the laminates can be advantageously used as exterior materials for automobiles, aircrafts, automotive vehicles, and the like which are each required to have an enhanced strength and a lighter weight, and are each required to have a relatively large area.

EXAMPLES

The present invention will hereinafter be described more specifically by way of examples. However, it should be understood that the present invention be not limited by the following examples.

The following measurement methods and evaluation methods are used in the present disclosure.

<Average Storage Elastic Modulus>

Adhesive agents prepared in Examples and Comparative Examples were each applied to a thickness of 0.5 mm onto a Teflon® plate, and heat-cured at 180° C. for 20 minutes in a hot air drying oven. Thereafter, the cured adhesive agent was naturally cooled, and then a test piece having a width of 5 mm and a length of 10 mm was prepared by cutting the cured adhesive agent. With the use of a dynamic viscoelasticity measuring apparatus (DVA225 available from IT measurement control Company) and a tension jig, the storage elastic moduli of the test piece were measured at a frequency of 10 Hz at a temperature increase rate of 10° C./minute in a measurement temperature range of 25° C. to 180° C. The average storage elastic modulus in a temperature range of 25° C. to 180° C. was calculated by dividing the sum of the storage elastic moduli in a measurement temperature range of 25° C. to 180° C. by the number of measurement points.

<Warpage Amounts (CAE)>

An aluminum plate (having a linear expansion coefficient of $23 \times 10^{-6}$ [1/K], a Young's modulus of 70 GPa, and a Poisson ratio of 0.3) having a width of 25 mm, a length of 100 mm, and a thickness of 1.6 mm, and a cold-rolled steel plate (SPCC) (having a linear expansion coefficient of $16 \times 10^{-6}$ [1/K], a Young's modulus of 200 GPa, and a Poisson ratio of 0.3) having a width of 25 mm, a length of 100 mm, and a thickness of 1.6 mm were prepared. The adhesive agents prepared in Examples and Comparative Examples were each applied to a thickness of 0.1 mm between the aluminum plate and the cold-rolled steel plate (SPCC), and the resulting laminate (an analysis model laminate) was divided into finite elements of an analysis model.

When the temperature of the analysis model laminate was changed from 180° C. to 25° C. with a middle portion of the cold-rolled steel plate (SPCC) fixed in place, a displacement amount (warpage amount (A)) at an end of the analysis model laminate was determined through simulation (finite element structure analysis) with the use of an CAE (Computer Aided Engineering) software ANSYS.

Further, analysis model laminates were prepared in substantially the same manner as described above, except that the thickness of the adhesive agent was changed to 0.2 mm, 0.4 mm, and 0.7 mm. Then, the warpage amounts (A) of these analysis model laminates were determined with the use of the CAE software.

<Warpage Reduction Index (CAE)>

In substantially the same manner as described above for the determination of the warpage amounts (A) in <Warpage Amounts (CAE)>, a reference model laminate was prepared without providing the adhesive agent layer between the aluminum plate and the cold-rolled steel plate (SPCC), and a displacement amount (warpage amount (B)) of the reference model laminate was determined with the use of the CAE software. The warpage reduction index was calculated based on the warpage amount (B) thus determined and each of the warpage amounts (A) determined in <Warpage Amounts (CAE)> from the following expression (1):

Warpage reduction index=100−(WA/WB)×100 (1)

wherein WA is the warpage amount (A), and WB is the warpage amount (B).

<Reduction Efficiency>

The warpage reduction efficiency of each of the adhesive agents prepared in Examples and Comparative Examples was evaluated based on the following criteria:

o (good): The warpage reduction index was not less than 30 when the thickness of the adhesive agent was 0.7 mm.

x (poor): The warpage reduction index was less than 30 when the thickness of the adhesive agent was 0.7 mm.

<Tensile Shear Adhesive Strength>

The tensile shear adhesive strength was measured by the following method in conformity with JIS K6850.

Two stainless steel plates (SUS) each having a width of 25 mm, a length of 100 mm, and a thickness of 1.6 mm were prepared. The adhesive agents prepared in Examples and Comparative Examples were each applied to a thickness of 0.2 mm in a region having a width of 25 mm and a length of 12.5 mm on one of the stainless steel plates. The stainless steel plates (SUS) were press-bonded to each other via the applied adhesive agent with the use of a clamp, and the adhesive agent was heat-cured at 180° C. for 20 minutes.

Thus, a test piece was prepared. The tensile shear adhesive strength of the test piece was measured at a rate of 5 mm/minute at 23° C. at 50% RH by means of a tensile tester (AUTOGRAPH AG-X available from Shimadzu Corporation).

<Warpage Amount (Actual Measurement Value)>

An aluminum plate (A5052P available from Nippon Testpanel Co., Ltd.) having a width of 25 mm, a length of 100 mm, and a thickness of 1.6 mm, and an iron panel (cold-rolled steel plate (SPCC-SB) specified in JIS G3141 and available from Nippon Testpanel Co. Ltd.) having a width of 25 mm, a length of 140 mm, and a thickness of 1.6 mm were used as standard test pieces.

The adhesive agents prepared in Examples and Comparative Examples were each evenly applied to a thickness of 0.2 mm on the entire surface of the aluminum plate. Then, the iron plate was placed on the applied adhesive agent from above, and the iron plate and the aluminum plate were press-bonded to each other with the use of a clamp. Thus, a laminate was produced. The laminate was heated in a hot air drying oven at 180° C. for 20 minutes to cure the adhesive agent, and then naturally cooled. After the clamp was removed from the resulting laminate, the laminate was placed on a stainless steel plate (SUS) with the aluminum plate facing down. The total thickness of the laminate and the stainless steel plate (SUS) was measured at a single center point and at four corner points with the use of an ABS DIGIMATIC indicator (ID-SX available from Mitutoyo Corporation), and a warpage amount was determined from the following expression (2):

$$\text{Warpage amount} = T_c - T_a \tag{2}$$

wherein Tc is the thickness at the center point, and Ta is the average of the thicknesses at the four corner points.

<Warpage Amount (Evaluation)>

The actually measured warpage amount was evaluated based on the following criteria:
 o (very good): The warpage amount was less than 0.3 mm.
 Δ (good): The warpage amount was not less than 0.3 mm and less than 0.5 mm.
 x (poor): The warpage amount was not less than 0.5 mm.

[Production of Epoxy Resin Precursor]

An epoxy resin precursor produced in the following manner was used in Examples 1 to 4.

<Production of Epoxy Resin Precursor (c)>

First, 141.8 parts by mass (hereinafter referred to simply as "parts") of 1,6-hexanediol and 0.51 parts of trifluoroboron ethyl ether each preliminarily heated to 45° C. were put in a 1-L glass flask provided with a stirrer, a dropping funnel, and a thermometer, and heated up to 80° C. Then, 244.3 parts of epichlorohydrin was added dropwise to the resulting mixture over time, while the temperature was controlled to lower than 85° C. After the resulting mixture was aged at a temperature of 80° C. to 85° C. for one hour, the mixture was cooled to 45° C. Then, 528.0 parts of a 22 mass % sodium hydroxide aqueous solution was added to the resulting mixture, which was in turn heated to 45° C. and vigorously stirred for 4 hours. After a reaction product was cooled to a room temperature (25° C.), a water phase was separated and removed, and unreacted epichlorohydrin and water were removed by heating at a reduced pressure. As a result, 283.6 parts of crude 1,6-hexanediol diglycidyl ether was produced.

The crude 1,6-hexanediol diglycidyl ether was distilled to be purified in an Oldershaw type distillation column (with 15 stages), and 127.6 parts of 1,6-hexanediol diglycidyl ether was obtained as a main fraction in a temperature range of 170° C. to 190° C. at a pressure of 1,300 Pa.

The diglycidyl form purity, the total chlorine amount, and the epoxy equivalent of the 1,6-hexanediol diglycidyl ether thus obtained were as follows: Diglycidyl form purity: 97 mass % Total chlorine amount: 0.15 mass % Epoxy equivalent: 116 g/equivalent Then, 100 parts of the bifunctional epoxy compound (1,6-hexanediol diglycidyl ether) thus obtained, 53.5 parts of bisphenol-F (having a phenolic hydroxyl group equivalent of 100 g/equivalent), and 0.08 parts of ethyltriphenylphosphonium iodide (30 mass % methyl cellosolve solution) as a polymerization initiator were put in a pressure-resistant reaction vessel, and a polymerization reaction was allowed to proceed at a temperature of 165° C. to 170° C. for five hours in a nitrogen gas atmosphere. Thus, an epoxy resin precursor (a) was produced.

The epoxy resin precursor (a) thus produced had an epoxy equivalent of 500 g/equivalent and a number average molecular weight of 1,600.

Example 1

After 66 g of the epoxy resin precursor (a) and 19 g of a phenol novolak epoxy compound jER152 (available from Mitsubishi Chemical Corporation) as an epoxy resin precursor were put in a plastic container, 15 g of a high-molecular weight saturated copolymer polyester resin NICHIGO-POLYESTER LP-011 (available from Mitsubishi Chemical Corporation) was added as a modified resin to the plastic container. The resulting mixture was heated and mixed at 100° C., and stirred and degassed in vacuo for 5 minutes. The epoxy resin precursors and the modified resin were each preliminarily heated to 70° C. before the mixing.

Thereafter, the resulting mixture was cooled to 60° C., and then 8 g of dicyandiamide DICY7 (available from Mitsubishi Chemical Corporation) as a latent curing agent and 2 g of dichlorophenyldimethylurea DCMU (available from Nacalai Tesque, Inc.) were added to the mixture. The resulting mixture was stirred and degassed in vacuo for 5 minutes. Thus, an adhesive agent sample was prepared.

Example 2

After 64 g of the epoxy resin precursor (a) and 16 g of a phenol novolak epoxy compound jER152 (available from Mitsubishi Chemical Corporation) as an epoxy resin precursor were put in a plastic container, 20 g of an acryl-modified epoxy resin NS7008 (available from Mitsubishi Chemical Corporation) was added as a modified resin to the plastic container. The resulting mixture was heated and mixed at 100° C., and stirred and degassed in vacuo for 5 minutes. The epoxy resin precursors and the modified resin were each preliminarily heated to 70° C. before the mixing.

Thereafter, the resulting mixture was cooled to 60° C., and then 8 g of dicyandiamide DICY7 (available from Mitsubishi Chemical Corporation) as a latent curing agent and 2 g of dichlorophenyldimethylurea DCMU (available from Nacalai Tesque, Inc.) were added to the mixture. The resulting mixture was stirred and degassed in vacuo for 5 minutes. Thus, an adhesive agent sample was prepared.

Example 3

An adhesive agent sample was prepared in substantially the same manner as in Example 2, except that the proportion of the acryl-modified epoxy resin NS7008 (available from Mitsubishi Chemical Corporation) was changed as shown in Table 1.

Example 4

An adhesive agent sample was prepared in substantially the same manner as in Example 2, except that the proportions of the epoxy resin precursor (a) and jER152 (available from Mitsubishi Chemical Corporation) were changed as shown in Table 1.

Example 5

First, 20 g of a bisphenol-A epoxy compound jER828 (available from Mitsubishi Chemical Corporation), 20 g of a bisphenol-A epoxy compound jER1001 (available from Mitsubishi Chemical Corporation), 40 g of ADEKA RESIN EPR-1630 (available from ADEKA Corporation) which is a mixture of 80 to 90 mass % of a CTBN-modified epoxy resin and 10 to 20 mass % of a bisphenol-A epoxy compound, and 20 g of KaneAce® MX-154 (available from Kaneka Corporation) which is a mixture of 55 to 65 mass % of a bisphenol-A epoxy compound and 35 to 45 mass % of a MBS polymer (core-shell acryl rubber) were put in a plastic container, then heated and mixed at 100° C., and stirred and degassed in vacuo for 5 minutes.

Thereafter, the resulting mixture was cooled to 60° C., and then 8 g of dicyandiamide DICY7 (available from Mitsubishi Chemical Corporation) as a latent curing agent and 2 g of dichlorophenyldimethylurea DCMU (available from Nacalai Tesque, Inc.) were added to the mixture. The resulting mixture was stirred and degassed in vacuo for 5 minutes. Thus, an adhesive agent sample was prepared.

Comparative Example 1

After 80 g of a bisphenol-A epoxy compound jER828 (available from Mitsubishi Chemical Corporation) as an epoxy resin precursor and 20 g of an epoxidized polybutadiene EPOLEAD PB3600 (available from Daicel Corporation) as a modified resin were put in a plastic container, the resulting mixture was heated and mixed at 100° C., and stirred and degassed in vacuo for 5 minutes. The epoxy resin precursor and the modified resin were each preliminarily heated to 70° C. before the mixing.

Thereafter, the resulting mixture was cooled to 60° C., and then 8 g of dicyandiamide DICY7 (available from Mitsubishi Chemical Corporation) as a latent curing agent and 2 g of dichlorophenyldimethylurea DCMU (available from Nacalai Tesque, Inc.) were added to the mixture. The resulting mixture was stirred and degassed in vacuo for 5 minutes. Thus, an adhesive agent sample was prepared.

Comparative Example 2

An adhesive agent sample was prepared in substantially the same manner as in Comparative Example 1, except that the proportions of the bisphenol-A epoxy resin jER828 (available from Mitsubishi Chemical Corporation) as the epoxy resin precursor and the epoxidized polybutadiene EPOLEAD PB3600 (available from Daicel Corporation) were changed as shown in Table 1.

Comparative Example 3

An epoxy resin adhesive agent of single-component curing type (Scotch-Weld SW-2214 available from 3M Company) was used as an adhesive agent sample.

Measurement and evaluation were performed on the adhesive agents prepared in Examples 1 to 5 and Comparative Examples 1 to 3 by the measurement methods and the valuation methods described above, and the results of the measurement and the evaluation are shown in Table 1.

TABLE 1

| Items | Example 1 | Example 2 | Example 3 | Example 4 | Example 5 | Comparative Example 1 | Comparative Example 2 | Comparative Example 3 |
|---|---|---|---|---|---|---|---|---|
| Adhesive agent (g) | | | | | | | | |
| Epoxy resin (α) | 66 | 64 | 64 | 56 | — | — | — | — |
| jER152 | 19 | 16 | 16 | 24 | — | — | — | — |
| NS7008 | — | 20 | 15 | 20 | — | — | — | — |
| jER828 | — | — | — | — | 20 | 80 | 90 | — |
| jER1001 | — | — | — | — | 20 | — | — | — |
| EPOLEAD PB3600 | — | — | — | — | — | 20 | 10 | — |
| LP-011 | 15 | — | — | — | — | — | — | — |
| EPR-1630 | — | — | — | — | 40 | — | — | — |
| KaneAce MX-154 | — | — | — | — | 20 | — | — | — |
| SW-2214 | — | — | — | — | — | — | — | 100 |
| DICY7 | 8 | 8 | 8 | 8 | 8 | 8 | 8 | — |
| DCMU | 2 | 2 | 2 | 2 | 2 | 2 | 2 | — |
| Average storage elastic modulus (25° C. to 180° C.) | | | | | | | | |
| MPa | 5 | 85 | 104 | 201 | 61 | 445 | 669 | 3186 |
| Warpage amount (CAE) | | | | | | | | |
| t = 0.1 mm | 0.28 | 0.64 | 0.65 | 0.68 | 0.61 | 0.71 | 0.72 | 0.73 |
| t = 0.2 mm | 0.19 | 0.59 | 0.60 | 0.64 | 0.54 | 0.67 | 0.69 | 0.70 |
| t = 0.4 mm | 0.12 | 0.51 | 0.53 | 0.58 | 0.46 | 0.62 | 0.64 | 0.66 |
| t = 0.7 mm | 0.09 | 0.44 | 0.46 | 0.52 | 0.41 | 0.56 | 0.58 | 0.60 |
| Warpage reduction index (CAE) | | | | | | | | |
| t = 0.1 mm | 63 | 17 | 16 | 11 | 22 | 9 | 7 | 6 |
| t = 0.2 mm | 76 | 24 | 23 | 16 | 30 | 13 | 12 | 10 |
| t = 0.4 mm | 85 | 34 | 32 | 23 | 41 | 20 | 18 | 15 |
| t = 0.7 mm | 90 | 43 | 41 | 31 | 48 | 27 | 25 | 22 |
| Reduction efficiency | ○ | ○ | ○ | ○ | ○ | X | X | X |

TABLE 1-continued

| Items | Example 1 | Example 2 | Example 3 | Example 4 | Example 5 | Comparative Example 1 | Comparative Example 2 | Comparative Example 3 |
|---|---|---|---|---|---|---|---|---|
| Tensile shear adhesive strength | | | | | | | | |
| MPa | 16 | 21 | 20 | 21 | 28 | 22 | 27 | 23 |
| Warpage amount | | | | | | | | |
| mm | 0.03 | 0.24 | 0.26 | 0.48 | 0.47 | 0.65 | 0.70 | 0.61 |
| Evaluation | ○ | ○ | ○ | Δ | Δ | X | X | X |

The adhesive agents of Examples 1 to 5 each had a warpage reduction index of not less than 30 when each having a thickness of 0.7 mm, and the actually measured warpage amounts were each not greater than 0.5 mm.

Thus, it was confirmed that the laminates produced by using the adhesive agents of Examples 1 to 5 each had a reduced warpage after the heat curing of the adhesive agents.

The adhesive agents of Examples 1 to 5 each had a tensile shear adhesive strength of not less than 10 MPa, ensuring excellent adhesion between the first and second materials.

This is supposedly because the adhesive agents of Examples 1 to 5 each contain an epoxy resin having both an aliphatic skeleton and a skeleton derived from an aromatic compound and, therefore, are each imparted with the flexibility by the aliphatic skeleton and imparted with the rigidity and the adhesiveness to metals by the skeleton derived from the aromatic compound.

Further, the adhesive agents of Examples 1 to 3 each had a warpage reduction index of not less than 40 when each having a thickness of 0.7 mm, and the actually measured warpage amounts were each not greater than 0.3 mm.

Thus, it was confirmed that the laminates produced by using the adhesive agents of Examples 1 to 3 each had a further reduced warpage after the heat curing of the adhesive agents.

The adhesive agents of Examples 2 to 5 each had an average storage elastic modulus of not less than 80 MPa in a temperature range of 25° C. to 180° C. and a tensile shear adhesive strength of not less than 20 MPa, thereby ensuring particularly excellent adhesion between the first and second materials.

Further, an adhesive agent sheet (having a thickness of 0.8 mm) was produced by applying each of the adhesive agents of Examples 1 to 3 onto a base film (a PET film MRF75 release-treated with silicone) and inserting another base film from the other side by means of a laminator. The use of the adhesive agent sheet thus produced also ensured a comparable warpage reduction efficiency and a more excellent tensile shear adhesive strength.

Further, an adhesive agent sheet (having a thickness of 0.8 mm) was produced by impregnating a glass fiber nonwoven fabric (RAP-110 available from Oribest Co., Ltd. and having a density of 0.16 g/cm³) with each of the adhesive agents of Examples 1 to 3. The use of the adhesive agent sheet thus produced also ensured a comparable warpage reduction efficiency and a more excellent tensile shear adhesive strength.

On the other hand, the adhesive agents of Comparative Examples 1 to 3, which were each prepared by using an ordinary epoxy resin (bisphenol-A diglycidyl ether BPADGE) as the epoxy resin precursor and each had an average storage elastic modulus of greater than 400 MPa in a temperature range of 25° C. to 180° C., each had a warpage reduction index of less than 30 when each having a thickness of 0.7 mm. Therefore, the actually measured warpage amounts were each greater than 0.5 mm, so that the warpage reducing effect was insufficient.

The above results indicate that the laminates each produced by laminating the plurality of materials having different linear expansion coefficients via the adhesive agent having a warpage reduction index of not less than 30 as measured when the thickness thereof was 0.7 mm had a reduced warpage after the heat curing of the adhesive agent. Therefore, the laminates produced by using the adhesive agents of Examples are each advantageous for automotive exterior materials.

While specific forms of the embodiments of the present invention have been shown in the aforementioned examples, the examples are merely illustrative but not limitative. It is contemplated that various modifications apparent to those skilled in the art could be made within the scope of the invention.

The invention claimed is:

1. A laminate comprising a first material, an adhesive agent layer, and a second material provided in this order,
    wherein the first material and the second material have different linear expansion coefficients,
    wherein the adhesive agent layer comprises an adhesive agent having a warpage reduction index of not less than 30,
    wherein a content of an epoxy resin comprised in the adhesive agent is 85 mass % or more based on 100 mass % of overall resin component of the adhesive agent,
    wherein the adhesive agent layer has an average storage elastic modulus of 1 to 400 MPa in a temperature range of 25° C. to 180° C.,
    the warpage reduction index of the adhesive agent being determined by:
    preparing an analysis model laminate having:
        an aluminum plate having a width of 25 mm, a length of 100 mm, and a thickness of 1.6 mm,
        a cold-rolled steel plate having a width of 25 mm, a length of 100 mm, and a thickness of 1.6 mm, and
        a layer of the adhesive agent between the aluminum plate and the cold-rolled steel plate, the layer of the adhesive agent having a thickness of 0.7 mm;
    preparing a reference model laminate having:
        an aluminum plate having a width of 25 mm, a length of 100 mm, and a thickness of 1.6 mm, and
        a cold-rolled steel plate having a width of 25 mm, a length of 100 mm, and a thickness of 1.6 mm,
        wherein the reference model laminate does not have any adhesive agent between the aluminum plate and the cold-rolled steel plate;
    determining a displacement amount WA at an end of the analysis model laminate by finite element structure analysis using Computer Aided Engineering (CAE)

software while a middle portion of the cold-rolled steel plate is fixed in place and a temperature of the analysis model laminate is changed from a starting temperature of 180° C. to a final temperature of 25° C.;

determining a displacement amount WB at an end of the reference model laminate by finite element structure analysis using Computer Aided Engineering (CAE) software while a middle portion of the cold-rolled steel plate is fixed in place and a temperature of the reference model laminate is changed from a starting temperature of 180° C. to a final temperature of 25° C.; and calculating the warpage reduction index from the following expression (1):

$$\text{Warpage reduction index} = 100 - (WA/WB) \times 100 \qquad (1).$$

2. The laminate according to claim 1, wherein the adhesive agent layer has a thickness of 0.1 to 2.0 mm.

3. The laminate according to claim 1, wherein the adhesive agent layer comprises an epoxy resin as a main component.

4. The laminate according to claim 1, wherein the adhesive agent layer comprises a bifunctional epoxy compound having an aliphatic skeleton and an aromatic skeleton.

5. The laminate according to claim 1, wherein the adhesive agent layer comprises an adhesive agent sheet.

6. The laminate according to claim 5,
wherein the adhesive agent sheet comprises a support base impregnated with the adhesive agent, and
wherein the support base is a nonwoven fabric.

7. The laminate according to claim 5, wherein the adhesive agent sheet comprises a support base having a density of 0.05 to 1.00 g/cm$^3$.

8. The laminate according to claim 1, wherein the first material comprises aluminum.

9. The laminate according to claim 1, wherein the second material comprises iron.

10. An automotive exterior material comprising the laminate according to claim 1.

11. A method for producing the laminate according to claim 1, comprising:
forming an adhesive agent into a sheet to provide an adhesive agent sheet;
preparing a first material and a second material having different linear expansion coefficients, and laminating the adhesive agent sheet between the first material and the second material; and
heat-curing the adhesive agent sheet.

12. The method according to claim 11, wherein the forming the adhesive agent into the sheet comprises impregnating a support base with the adhesive agent to provide the adhesive agent sheet.

13. A method for producing the laminate according to claim 1, comprising:
preparing a first material and a second material having different linear expansion coefficients and directly applying an adhesive agent to a surface of at least one of the first material and the second material to form an adhesive agent layer;
laminating the first material and the second material via the adhesive agent layer; and heat-curing the adhesive agent layer.

14. A laminate comprising a first material, an adhesive agent layer, and a second material laminated in this order,
wherein the first material and the second material have different linear expansion coefficients,
wherein a content of an epoxy resin comprised in the adhesive agent is 85 mass % or more based on 100 mass % of overall resin component of the adhesive agent,
wherein the adhesive agent layer has an average storage elastic modulus of 1 to 400 MPa in a temperature range of 25° C. to 180° C.

* * * * *